US005208540A

United States Patent [19]

Hoeflich

[11] Patent Number: 5,208,540

[45] Date of Patent: May 4, 1993

[54] IGNITION PERFORMANCE MONITOR AND MONITORING METHOD FOR CAPACITIVE DISCHARGE IGNITION SYSTEMS

[75] Inventor: Gary R. Hoeflich, Roscoe, Ill.

[73] Assignee: Coltec Industries Inc., New York, N.Y.

[21] Appl. No.: 843,187

[22] Filed: Feb. 28, 1992

[51] Int. Cl.[5] .......... G06F 15/48; F02P 17/00

[52] U.S. Cl. .......... 324/388; 364/431.04; 123/644

[58] Field of Search .......... 324/388, 402, 399, 378, 324/386; 73/116; 361/253; 123/609, 644; 364/431.04

[56] References Cited

U.S. PATENT DOCUMENTS

| | | | |
|---|---|---|---|
| 3,793,584 | 2/1974 | Libermann et al. . | |
| 3,942,102 | 3/1976 | Kuhn et al. . | |
| 4,006,403 | 2/1977 | Olsen et al. . | |
| 4,068,165 | 1/1978 | Labinsky et al. | 324/399 |
| 4,231,348 | 11/1980 | Schiele et al. | 123/644 |
| 4,277,752 | 7/1981 | Dinkelacker et al. . | |
| 4,298,941 | 11/1981 | Furuhashi | 123/609 |
| 4,327,310 | 4/1982 | Jorg | 123/644 |
| 4,362,144 | 12/1982 | Yamaguchi et al. | 123/644 |
| 4,367,722 | 1/1983 | Mizuno | 123/644 |
| 4,376,428 | 3/1983 | Hata et al. | 123/609 |
| 4,378,778 | 4/1983 | Harta | 123/644 |
| 4,547,734 | 10/1985 | Spauder . | |
| 4,558,280 | 10/1985 | Koehl et al. . | |
| 4,684,896 | 8/1987 | Weishaupt . | |
| 4,773,380 | 9/1988 | Narita et al. | 123/644 |
| 4,918,389 | 4/1990 | Schleupen et al. . | |
| 5,043,900 | 8/1991 | Allen et al. | 123/644 |
| 5,058,021 | 10/1991 | Scott | 364/431.04 |
| 5,075,628 | 12/1991 | Schuster et al. | 324/117 H |

*Primary Examiner*—Kenneth A. Wieder
*Assistant Examiner*—Maura K. Regan
*Attorney, Agent, or Firm*—Howard S. Reiter

[57] ABSTRACT

The ignition performance monitoring method and apparatus determines the time period during which the current generated in the primary winding of an ignition coil by a pulse from a capacitive discharge ignition system takes the decay to a zero ampere level and uses this determined period to calculate and indicate the firing voltage required to fire a spark plug. The apparatus includes a current sensor connected to sense the current in the primary winding of the ignition coil and a comparator to compare the sensed current with a reference indicative of a zero ampere current level. The comparator provides an output signal having a pulse width indicative of the time the sensed current was above the zero ampere level to a processor which uses the output signal and data values unique to the ignition coil employed to determine a firing voltage for a spark plug fired by the ignition coil.

17 Claims, 2 Drawing Sheets

IGNITION PERFORMANCE MONITOR AND MONITORING METHOD FOR CAPACITIVE DISCHARGE IGNITION SYSTEMS

TECHNICAL FIELD

This invention relates to ignition system monitoring units generally, and more particularly to an ignition performance monitor for monitoring the performance of a spark ignited engine which employs a capacitive discharge ignition system.

BACKGROUND ART

A number of monitoring systems for spark ignited engines have been developed in an attempt to effectively detect engine misfiring before engine performance deteriorates significantly. It has been found that the functioning of the engine ignition system can be tested to indicate an abnormal engine condition, such as a fouled or defective spark plug, an improperly balanced engine or a defective engine component associated with a particular cylinder. Such testing methods have proven to be particularly effective for monitoring spark plug condition, since this condition directly affects the function of the ignition system.

Many ignition system monitoring units measure a voltage characteristic occurring at the secondary winding of an ignition coil, and some of these systems are invasive and must be manually attached to the secondary winding. The voltage signal amplitude at the secondary winding is much greater than that of the signal at the primary winding, and these systems must perform the difficult task of accurately monitoring the high secondary voltage characteristic without disrupting the normal operation of the ignition system. Secondary voltage monitoring systems are shown by U.S. Pat. Nos. 3,793,584 to L. N. Liebermann et al., 3,942,102 to K. L. Kuhn et al., 4,006,403 to M. Olsen et al., 4,558,280 to S. E. Koehl et al., and 4,547,734 to H-W Spaude.

U.S. Pat. No. 4,277,752 to W. Dinkelackey et al. discloses a device for testing the ignition system of a combustion engine which includes an adjustable load connected in the primary winding of the ignition coil. The load is progressively increased until an ignition slip or misfire is detected, and from this, ignition energy reserve can be calculated to provide a measure for the condition of the whole ignition system. Although this system works from the primary winding of the ignition coil, it is very intrusive and can function only by intentionally causing a misfire. Thus no indication is provided of the performance of the ignition system under actual operation conditions.

Systems have been developed for monitoring voltage characteristics at the primary winding of an ignition coil during actual engine and ignition system operating conditions, and systems of this type are disclosed by U.S. Pat. Nos. 4,684,896 to W. Weishaupt and 4,918,389 to R. Schleupen et al. These patented systems rely upon waveform characteristics which are only present in inductive type ignition systems and which are not found in capacitive discharge (CD) type ignition systems. The peak primary voltage of a capacitive discharge ignition system is fixed, while the peak primary voltage of an inductive type ignition system varies as a function of the peak firing voltage (secondary voltage). Also, spark duration cannot readily be determined from the primary voltage waveform for a capacitive discharge ignition system, while the spark duration is easily determined from the primary voltage waveform in an inductive ignition system.

The misfire detection system and method of the Schleupen patent relies upon the extraction of spark duration information from the voltage in the primary winding of an ignition coil and the comparison of this information with a reference voltage of a predetermined magnitude and duration. The testing method and apparatus of the Weishaupt patent relies upon the peak primary voltage of an ignition coil being a function of the peak firing voltage to calculate spark plug condition. Thus neither of these systems will operate with a capacitive discharge ignition system.

DISCLOSURE OF THE INVENTION

It is a primary object of the present invention to provide a novel and improved ignition performance monitor for capacitive discharge ignition systems which provides measurements on a real-time basis during the operation of an internal combustion engine.

Another object of the present invention is to provide a novel and improved ignition performance monitor for capacitive discharge ignition systems which operates from waveform characteristics which are present in capacitive discharge ignition systems and which does not adversely affect normal system operation.

Yet another object of the present invention is to provide a novel and improved ignition performance monitor for capacitive discharge ignition systems which takes a measurement on the primary side of an ignition coil and which has the capability of monitoring up to sixteen ignition coils simultaneously so that all engine cylinders are simultaneously monitored.

A further object of the present invention is to provide a novel and improved ignition performance monitor for capacitive discharge ignition systems which measures the rate at which the magnetic field of the ignition coil collapses (i.e. current in the primary winding goes to zero) to obtain a relative indication of the voltage required to fire a spark plug.

A still further object of the present invention is to provide a novel and improved ignition performance monitor for capacitive discharge ignition systems which senses the flux density generated by current flowing through the primary side of an ignition coil. A pulse is then generated with a pulse width equal to the time that the current is above zero amps, and this time is measured to provide data from which the secondary voltage of the ignition transformer is computed.

These and other objects of the present invention include the provision of a novel and improved ignition performance monitor which operates effectively with the fixed peak primary ignition coil voltage provided by a capacitive discharge ignition system. Since this primary voltage is fixed, the monitor cannot employ a voltage reference signal indicative of a normal firing voltage as a reference for determining ignition system and engine condition. Consequently the monitor of the present invention employs a current measurement to measure the collapse of the magnetic field in an ignition coil by determining the time that the current through the primary winding of the ignition coil remains above a zero ampere level. A toroidal coil is provided between the output of a capacitive discharge ignition unit and the primary winding of an ignition coil to concentrate flux density into a small cross-sectional area so that the flux density can be measured by a Hall Effect sensor.

The output signal from the Hall Effect sensor is compared with a signal indicative of a zero ampere current level in a comparator, and the time duration of the comparator output is measured. This time duration measurement is used to produce an indication of the ignition coil secondary voltage required to fire a spark plug.

BEST MODE FOR CARRYING OUT THE INVENTION

Figure 1:
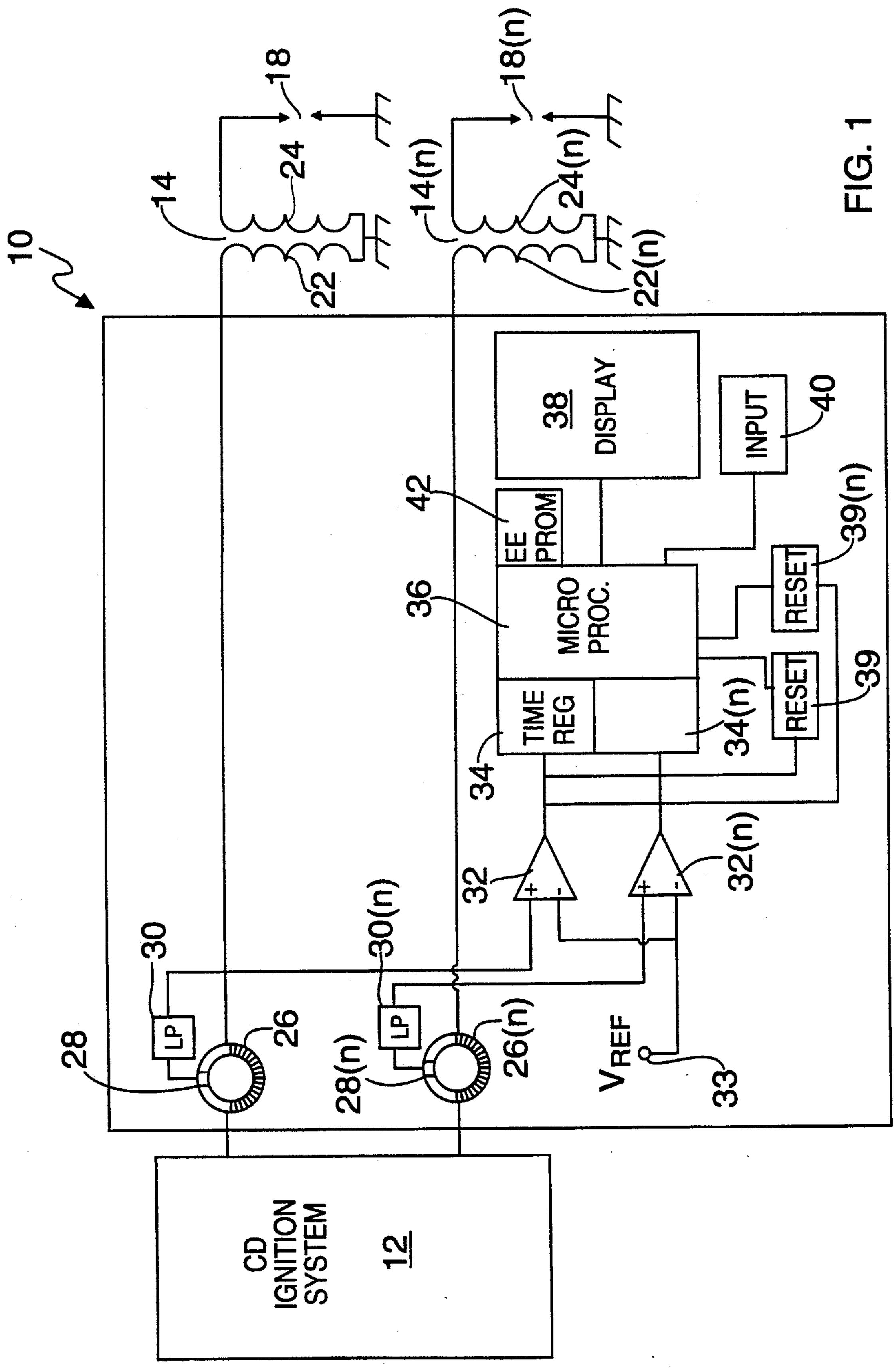
FIG. 1 is a block diagram showing the Ignition Performance Monitor for Capacitive Discharge Ignition System of the present invention.

Referring now to FIG. 1, the ignition performance monitor of the present invention indicated generally at 10 is connected between a capacitive discharge ignition system 12 of a conventional type and ignition coils 14 and 14(*n*) which operate in a conventional manner in response to pulses from the ignition system to fire spark plugs 18 and 18(*n*). Only two ignition coils and spark plugs are illustrated in FIG. 1 for purposes of example, but in actuality, the ignition performance monitor 10 is capable of operating simultaneously with up to sixteen ignition coils and spark plugs, so the ignition coils 14(*n*) and the spark plugs 18(*n*) represent up to fifteen of these components. Thus, the ignition performance monitor is capable of simultaneously monitoring the performance of each cylinder of a spark ignited engine, and an operator can quickly compare cylinder-to-cylinder operation to determine if any abnormal conditions exist.

Each of the ignition coils 14 and 14(*n*) includes a primary winding 22 and a secondary winding 24 which is connected to an associated spark plug. The ignition performance monitor 10 includes a toroidal winding 26 which is connected in series between the output from the capacitive discharge ignition system 12 and the primary winding 22 of an ignition coil. Since the ignition performance monitor circuit for each ignition coil is the same, one such monitor circuit channel will be described herein and the same reference numerals combined with an indicator (n) will be applied to like elements in the remaining monitor circuit channels to identify a plurality of identical channels.

The torroidal coil 26 receives the current output from the capacitive discharge ignition system 12 and concentrates the flux density resulting therefrom into a small cross-sectional area. This permits a Hall Effect sensor 28 to measure this flux density, and changes in the flux density are generated by the current flowing through the primary 22 of the respective ignition coil. The Hall Effect sensor 28 provides an output voltage proportional to this primary current, and this voltage is connected to a low pass filter 30 to remove any unwanted high frequency signal components. The filtered output from the low pass filter is then fed to a voltage comparator 32 where it is compared to a reference voltage from a reference source 33 that is proportional to a current of zero amperes.

The reference voltage from the source 34 is provided to the inverting input of the comparator 32 while the filtered output signal from the filter 30 is provided to the non-inverting input of the comparator. The comparator switches from a first state to a second state depending upon the relationship of the signals at its two inputs, and consequently, will provide an output pulse that has a duration (pulse width) equal to the length of time that the primary current through an associated primary winding 22 is above zero amps. The output of the comparator is connected to one of a plurality of timing registers 34 in a microprocessor 36, and a timing register is provided to receive the output from each of the comparators 32. Each timing register measures the time of the pulse from a comparator 32 which indicates the period during which the primary current is above zero amps. The timing register provides the microprocessor with a signal indicative of this time, and the microprocessor employs this time signal to mathematically produce an output indicative of the secondary voltage in the secondary winding 24 of an ignition coil available to fire an associated spark plug. This output indication from the microprocessor is displayed by any suitable display unit 38 such as a graphic LCD display module.

When the comparator 32 switches state at the end of an output pulse to indicate that the current through a primary winding 22 is no longer above zero amps, an interrupt signal will be provided by a reset signal generator 39 to the microprocessor 36. Upon receiving this interrupt signal, the microprocessor will read the number of clock cycles that have accumulated in the timing register 34 during the duration of the pulse width from the comparator. The microprocessor will then zero the timing register in anticipation of the next pulse width to be measured, will scan all channels to determine which one caused the interrupt signal, and will store the clock cycle number from the timing register in a memory location reserved for that channel.

The ignition coils which may be used for the ignition coils 14, 14(*n*), can be of different types, and each type of ignition coil has a characteristic slope (M) which will affect the rate at which the magnetic field of the ignition coil collapses as well as a unique characteristic represented by a constant (B). Consequently, the microprocessor 36 must be able to access information pertaining to the specific type of ignition coil connected to the capacitive discharge ignition system 12.

A suitable input unit 40 is connected to the microprocessor 36 to provide information to the microprocessor indicative of the type of ignition coils which form the ignition coils 14 and 14(*n*). This input could constitute a series of DIP switches which will be set to appropriate positions by an operator to identify an ignition coil type for each channel. Alternatively, the input 40 might constitute a serial port through which an ignition coil identifier is communicated to the microprocessor by means of a keyboard or other input unit. The identifier information from the input 40 is then stored in an EEPROM 42.

The microprocessor 36 will process the pulse width measurements (PW) taken from the timing register 34 based upon the type of ignition coils being used in the channel involved. In general, the secondary voltage (KV) in the involved ignition coil will be determined by the formula:

$KV = M \times PW + B$

Since the slope (M) and the constant (B) are characteristic of the type of coil used, this information will be provided to the microprocessor from the EEPROM 42 and once the secondary voltage is computed, the data is formatted and displayed on the display 38.

Figure 2:
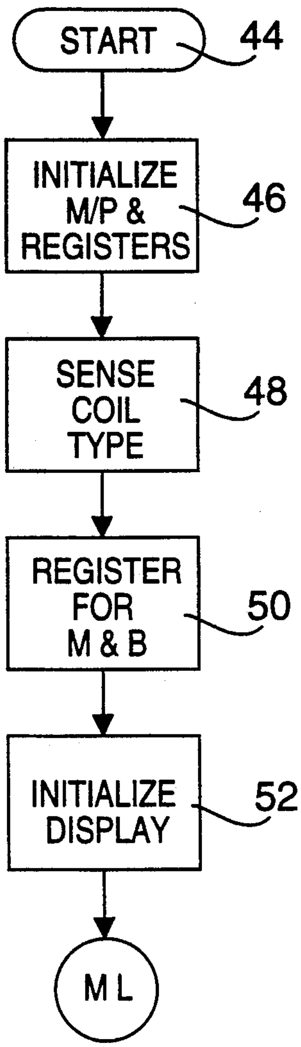
FIG. 2 is a flow diagram of the initialize procedure performed by the processor for the ignition performance monitor of FIG. 1.
Figure 3:
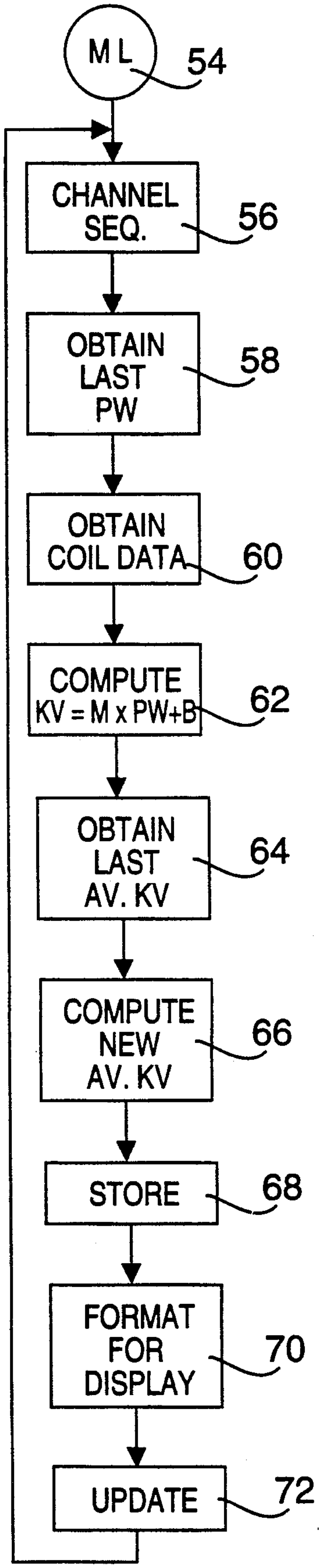
FIG. 3 is a flow diagram of the main loop procedure performed by the processor for the ignition performance monitor of FIG. 1.
Figure 4:
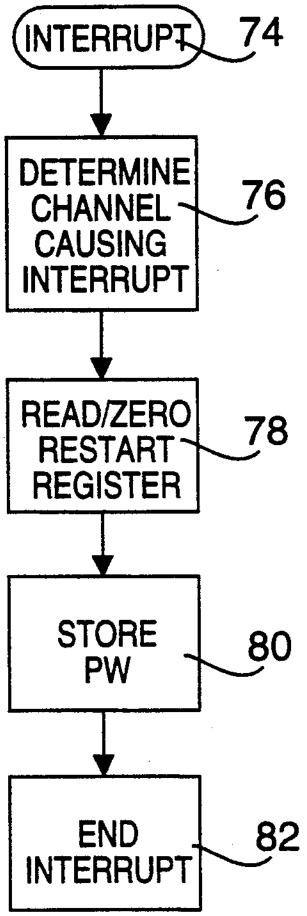
FIG. 4 is a flow diagram of the interrupt procedure performed by the processor for the ignition performance monitor of FIG. 1.

The operation of the microprocessor 36 may best be understood by referring to the flow diagrams of FIGS. 2–4. When power is provided to the ignition performance monitor 10 to start the microprocessor at 44, the microprocessor will initialize all memory locations and registers at 46. It will then make a determination at 48 as to what type of ignition coils are being used in each channel to fire the respective spark plugs 18 and 18(*n*). Normally, the same type of ignition coil will be used in every channel, and when this is the case, only a single coil type identified by the input 40 is sensed at 48 and registered at 50 to identify the slope and constant information for this specific coil type for all channels.

It is, of course, possible for different types of coils to be present in some of the channels, and if this is the case, the input 40 is operative to provide both a coil type indicator as well as a channel indicator. When this is sensed at 48, the coil types are registered in separate registers at 50 for each channel, so when that channel is sequenced by the microprocessor, the slope and constant information for the coil used in that channel is provided.

Once the coil type is sensed and registered, the microprocessor initializes the display 38 at 52 and begins main loop operation at 54.

For main loop operation the microprocessor sequences through the channels at 56 to obtain a measurement for each channel. When a channel is sequenced, the last stored output pulse data from the timing register 34—34(*n*) for that channel is obtained at 58, while the registered coil type data for this specific channel is obtained at 60. At 62, this data is combined to compute the secondary voltage for the coil type present in the channel. Then, at 64, the last stored average secondary voltage data is obtained, and this is averaged at 66 with the most recent secondary voltage data computed at 62. This new average secondary voltage is stored at 68 in a memory location dedicated to the channel involved, and will be employed in the next average secondary voltage computation for this channel. Also, the new average secondary voltage data is formatted for display at 70, and the display 38 is updated at 72. Then the main loop is caused at 56 to sequence the next channel to be reviewed.

The ignition performance monitor 10, when energized, continuously takes measurements on all channels during the operation of the capacitive discharge ignition system 12. As previously indicated, each channel, at the end of a measurement, causes a reset or interrupt signal to be provided from a reset signal generator 39—39(*n*) to the microprocessor 36. As illustrated in FIG. 4, when the microprocessor receives an interrupt signal at 74, it first determines the channel which is causing the interrupt at 76. The microprocessor will then read the data stored in the timing register 34—34(*n*) for this channel and will then zero and restart this register as indicated at 78. The data read from the register will be stored at 80 for subsequent use in the main loop computation, and the interrupt cycle will be ended at 82.

In some cases, it may be desirable to program a set point value into the microprocessor 36 which is compared with each secondary voltage value computed at 62. If the secondary voltage calculated at 62 exceeds the set point, then an alarm function can be activated.

INDUSTRIAL APPLICABILITY

The ignition performance monitor 10 takes measurements in real-time during the operation of an internal combustion engine without interruption of normal engine performance. The monitor has the capability of monitoring the operation of a plurality of engine cylinders at one time and will indicate abnormal conditions to a user.

I claim:

1. An ignition performance monitor to receive the ignition current from a capacitive discharge ignition system which is provided by the capacitive discharge ignition system to the primary winding of an ignition coil which has a secondary winding connected to fire a spark plug comprising current sensing means connected to sense the ignition current provided by said capacitive discharge ignition system to said primary winding and operative to provide a sense signal which is a function of said ignition current and indicative thereof, said current sensing means including a toroidal coil connected in series with said primary winding and a Hall Effect sensor to measure the flux density of said torodial coil;

duration determining means connected to said current sensing means to receive said sense signal and operating to provide an output signal indicative of a time period during which the current sensed by said current sensing means exceeds zero amperes, and processor means connected to receive said output signal and operative to compute therefrom a value indicative of the firing voltage required to fire said spark plug.

2. The ignition performance monitor of claim 1 wherein said duration determining means includes reference means for providing a reference signal indicative of a current of zero amperes and comparator means for comparing the sense signal form said current sensing means with said reference signal to provide said output signal.

3. The ignition performance monitor of claim 1 wherein said output signal has a pulse width which is indicative of the time period during which the current sensed by said current sensing means exceeds zero amperes.

4. The ignition performance monitor of claim 2 wherein said output signal has a pulse width which is indicative of the time period during which the current sensed by said current sensing means exceeds zero amperes.

5. The ignition performance monitor of claim 1 wherein said processor means includes ignition coil data for said ignition coil, said ignition coil data includign a slope data value for said ignition coil, said processor means operating to compute the value indicative of the firing voltage required to fire said spark plug using said output signal and ignition coil data.

6. The ignition performance monitor of claim 5 wherein said processor means operates to store at least one previously calculated firing voltage for said spark plug as a previously stored firing voltage and computes the next successive firing voltage by using said output signal and ignition coil data to calculate an instantaneous voltage value and by then averaging said instantaneous voltage value with said previously stored firing voltage value to obtain an updated firing voltage value.

7. An ignition performance monitor for connecting between a capacitive discharge ignition system and a plurality of ignition coils each having a primary winding connected to receive ignition current pulses from said capacitive discharge ignition system and a second winding connected to fire a spark plug comprising a current sensing means connected to sense the current in each said primary winding and to provide a sense signal indicative thereof, a duration determining means connected to each said current sensing means and operative to provide an output signal for each time period during which the current sensed by the respective connected current sensing means exceeds zero amperes, said output signal having a pulse width which is indicative of the time period during which the current sensed by said current sensing means exceeds zero amperes, and processor means connected to receive the output signals form each said duration determining means, said processor means operating to store ignition coil data for each said ignition coil which includes a slope data value for each said ignition coil, the processor means operating to compute a firing voltage value indicative of the voltage required to fire each said spark plug using said output signal and ignition coil data for the ignition coil connected to fire said spark plug.

8. The ignition performance monitor of claim 7 wherein said stored ignition coil data includes a constant value for each ignition coil.

9. The ignition performance monitor of claim 8 wherein said processor means computes each firing voltage KV in accordance with the formula $KV=M\times PW+B$ where M is the stored slop value of the ignition coil, B is the stored constant value for the ignition coil and PW is time period indicated by the pulse width of said output signal.

10. The ignition performance monitor of claim 8 wherein said processor means operates to store at least one previously calculated firing voltage for each spark plug as a previously stored firing voltage and calculates the next successive firing voltage for said spark plug by using said slope data value, constant value and an output signal from a duration determining means to calculate an instantaneous voltage value and by then averaging said instantaneous voltage value with said previously stored voltage value to obtain a firing voltage value.

11. The ignition performance monitor of claim 7 wherein said processor means includes a register means connected to each said duration determining means to receive the output signal therefrom and register a value indicative of the pulse width of each output signal received, said performance monitor further including a reset generator means connected to each duration determining means and said processor means, said reset generator means operating at the end of the output signal from said duration determining means to provide an interrupt signal to said processor means, said processor means operating upon receipt of an interrupt signal to read and store the value registered by said register means and to restart said register means.

12. The ignition performance monitor of claim 11 wherein said processor means operates to use the value stored from said register means and said ignition coil data to calculate a firing voltage for each spark plug.

13. The ignition performance monitor of claim 12 wherein each said current sensing means includes a toroidal coil connected in series between said capacitive discharge ignition system and the primary winding of an ignition transformer and a Hall Effect sensor to measure the flux density of said toroidal coil to provide said sense signal.

14. The ignition performance monitor of claim 13 wherein each said duration determining means includes reference means for providing a reference signal indicative of a current of zero amperes and a comparator means for comparing the sense signal from said Hall Effect sensor with said reference signal to provide said output signal.

15. A method for monitoring the ignition performance of an internal combustion engine having ignition coils for firing engine spark plugs under the control of a capacitive discharge ignition system which includes determining the time period during which the current generated in the primary winding of an ignition coil by a pulse from the capacitive discharge ignition system takes to decay to a zero ampere level, and using the determined time period with a value indicative of the slope of the ignition coil to determine the firing voltage required to fire said spark plug.

16. The method of claim 15 which includes averaging the firing voltage calculated to fire a spark plug with at least one previously calculated firing voltage for said spark plug.

17. The method of claim 15 where each firing voltage KV is determined in accordance with the formula $$KV=M\times PW+B$$

where M is the slope of the ignition coil and B is a constant for the coil while PW is the determined time period.

* * * * *